(12) United States Patent  
Siggard

(10) Patent No.: US 11,417,086 B2
(45) Date of Patent: Aug. 16, 2022

(54) PERSONALIZED AUGMENTED REALITY

(71) Applicant: Nathaniel Grant Siggard, Tarzana, CA (US)

(72) Inventor: Nathaniel Grant Siggard, Tarzana, CA (US)

(*) Notice: Subject to any disclaimer, the term of this patent is extended or adjusted under 35 U.S.C. 154(b) by 0 days.

(21) Appl. No.: 15/953,433

(22) Filed: Apr. 14, 2018

(65) Prior Publication Data
US 2018/0330167 A1 Nov. 15, 2018

Related U.S. Application Data

(60) Provisional application No. 62/486,426, filed on Apr. 17, 2017.

(51) Int. Cl.
*G06V 20/10* (2022.01)
*G06T 13/80* (2011.01)
*G06T 11/60* (2006.01)
*H04N 21/81* (2011.01)
*H04N 21/2668* (2011.01)
*H04N 21/00* (2011.01)
*H04N 21/414* (2011.01)
(Continued)

(52) U.S. Cl.
CPC .............. *G06V 20/10* (2022.01); *G06T 11/60* (2013.01); *G06T 13/80* (2013.01); *H04N 21/00* (2013.01); *H04N 21/2668* (2013.01); *H04N 21/2743* (2013.01); *H04N 21/41407* (2013.01); *H04N 21/4223* (2013.01); *H04N 21/4532* (2013.01); *H04N 21/816* (2013.01); *H04N 21/8146* (2013.01)

(58) Field of Classification Search
CPC ........... G06K 9/00664; G06K 9/00234; G06K 9/6202; G06K 9/4671; G06T 13/08; G06T 11/60; G06T 11/00; G06T 7/74; G06T 7/70; G06T 2207/30208; H04N 21/00; H04N 21/2668; H04N 21/816; H04N 21/41407; H04N 21/4223; H04N 21/8146; H04N 21/2743; G10L 21/06; G06Q 90/00; G06Q 30/02; G06F 17/50; G06F 16/5838; Y04S 10/54
See application file for complete search history.

(56) References Cited

U.S. PATENT DOCUMENTS

2011/0093274 A1* 4/2011 Lee .................. G10L 21/06 704/276
2016/0307057 A1* 10/2016 Li .................. G06F 16/5838
2018/0182171 A1* 6/2018 Lipner .............. G06T 11/00

* cited by examiner

*Primary Examiner* — Jennifer Mehmood
*Assistant Examiner* — Andrew Shin
(74) *Attorney, Agent, or Firm* — Plager Schack LLP; Mark H. Plager; Stephen Hallberg

(57) ABSTRACT

A system for personalizing augmented reality for individuals that is easy to use. There is a central server with instructions for selecting or creating a personally meaningful multimedia object. A sound wave and an image of the sound wave are generated from the object. A tattoo of the generated image is applied as a tattoo, either permanently or temporarily, to a person. Automatically generating, assigning and storing a unique identifier from an uploaded image of the tattoo, the generated image, and the multimedia object to the central server. Capturing an image of the tattoo on the person using a smart device, where the smart device has instructions to determine the unique identifier from an image captured by the smart device. Retrieving and downloading, aligning and overlaying the stored multimedia where it is played back.

8 Claims, 24 Drawing Sheets

(51) Int. Cl.
*H04N 21/2743* (2011.01)
*H04N 21/45* (2011.01)
*H04N 21/4223* (2011.01)

Figure 14

PERSONALIZED AUGMENTED REALITY

CROSS-REFERENCE TO RELATED APPLICATIONS

This Application claims the benefit under 35 U.S.C. § 119(e) of U.S. Provisional Patent Application Ser. No. 62/486,426, filed on 2017 Apr. 17, the contents of which are incorporated herein by reference in their entirety.

FIELD OF THE INVENTION

The present invention is in the technical field of augmented reality, and more particularly, a system for personalizing augmented reality for individuals that is easy to use.

BACKGROUND OF THE INVENTION

Currently, there are a variety of commercial augmented reality systems available. However, these systems only allow for static images to be used for commercial purposes. The current augmented reality systems only send the user to an advertiser's product or web page or enhance a location showing the individual retail spaces or other commerce. The vast majority of augmented reality is used in gaming for fixed scenarios. Individual customization is not possible for the average person. Personal information that is meaningful cannot easily be created due to the complex coding and other computing hardware and software requirements. In some instances, a person may want to have a permanent memory associated with a specific event or other meaningful situations that can be remembered at a later date, or shared with others using augmented reality.

Therefore, there is a need for a system for personalizing augmented reality for individuals that is easy to use and does not have the limitations of the prior art.

SUMMARY

The present invention overcomes the limitations of the prior art by providing a system for personalizing augmented reality for individuals that is easy to use. The system has a central server and a storage. The central server comprises executable instructions for first, selecting or creating a personally meaningful multimedia object. Then, generating a sound wave from the selected multimedia object. Next, generating an image of the sound wave. Then, applying the generated image of either an object or the image of the sound wave is then applied as a tattoo, either permanently or temporarily, to a person. Next, uploading an image of the applied tattoo, the generated image, and the multimedia object are uploaded, via the Internet, to the central server; automatically generating a unique identifier based on the uploaded image, the generated image and the multimedia object. Then, assigning the a unique identifier to the uploaded data. Next, storing the uploaded data nd the unique identification in a storage. Then, capturing an image of the applied tattoo using a smart device, where the smart device comprises instructions executable on the smart device to view the tattoo on the person and determine the unique identifier from the image captured by the smart device. Next, retrieving the stored multimedia object from the central server using the determined unique identifier into the smart device, where the multimedia object is aligned and overlaid on the tattoo on the person. Finally, playing the retrieved multimedia from the central serve as an overlay on the smart device. The system also has one or more than one camera enabled smart device communicatively coupled to the central server.

The waveform can be selected from the group consisting of multimedia, audio or video recording converted from an analog representation to a digital image. Additionally, the waveform used to create the tattoo that will act as a unique identifier for playback and alignment of the stored augmented reality multimedia associated with the unique identifier. If the user selects a different type of multimedia to be stored and played back, the sound wave from that multimedia can also be used by itself or in conjunction with other indicia of the multimedia object to generate the unique identifier.

There is also provided a computer implemented method for personalizing augmented reality for individuals that is easy to use. The method comprises the steps of:

a. creating an augmented reality overlay and unique identifier from a photo of a tattoo;
b. uploading a multimedia sound wave form, an image of the tattoo, and an associated multimedia file to the central server;
c. creating an overlay either manually, automatically, or both manually and automatically;
d. automatically creating a unique identifier from the photograph of the finished tattoo, or, in the case of a pre-designed tattoo, the unique identifier is created based on an original design;
e. storing the unique identifier and all the associated data in a storage for later retrieval by a user; and
f. playing the associated data retrieved from the storage using the unique identifier as a timed overlay coincident with the playback of the associated data, where, preferably, the overly is a video overlay that is matched and aligned to the tattoo.

There is also provided another computer implemented method executable on a processor for personalizing augmented reality for individuals that is easy to use. The steps include:

a. selecting a multimedia file to be converted by a user;
b. converting the multimedia file into a two dimensional sound waveform;
c. capturing a photograph of a completed tattoo is taken;
d. uploading the multimedia file, the converted sound waveform, and the photograph of the completed tattoo are uploaded to a central server;
e. creating a unique identifier from the uploaded data, collectively the associated data;
f. creating an animated augmented reality overlay;
g. storing the animated augmented reality overlay with the associated data on the central server;
h. Next, an augmented reality application is initialized or used 914 to take an image or scan of the tattoo on the user's skin using a camera enabled device. The image or scan is used by image recognition in the application to determine the unique identifier of the associated data nd to locate the associated data stored in the central server 106.
i. automatically identifying the image using image recognition;
j. transmitting the associated data to the camera enabled smart device 112; and
k. overlaying, aligning and displaying the augmented reality in relation to the live image captured or scanned by the camera enabled smart device with all the options stored in the associated data.

The two dimensional sound waveform above is a tattoo. Optionally, the pre-designed tattoo images and the associated data can also be uploaded to the central server for commercial applications of the system. For example, a theme park can sell pre-made temporary tattoo for their guests that can be used to personalize a visit to the theme park and can be recalled later using the system by submitting the unique identifier. The animated augmented reality overlay can be created manually, automatically, or both manually and automatically.

BRIEF DESCRIPTION OF THE DRAWINGS

These and other features, aspects and advantages of the present invention will become better understood with regard to the following description, appended claims, and accompanying figures where:

FIG. 14 is a screenshot of the fourth step in the method shown in the flowchart of FIG. 10;

DETAILED DESCRIPTION OF THE INVENTION

Figure 1:
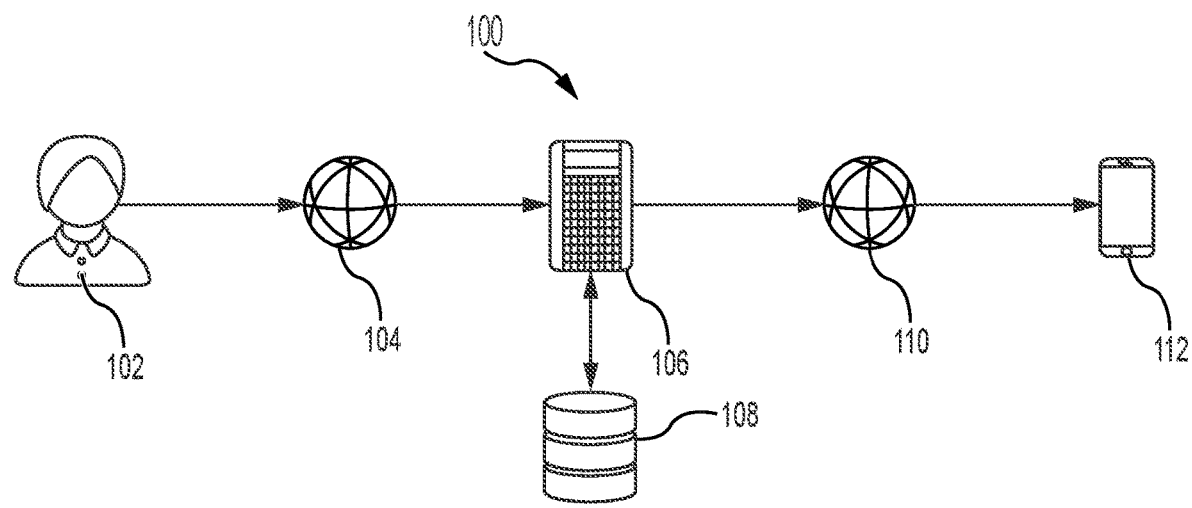
FIG. 1 is a diagram of a system for personalizing augmented reality for individuals that is easy to use, according to one embodiment of the invention.

The present invention overcomes the limitations of the prior art by providing a system for personalizing augmented reality for individuals that is easy to use.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

In the following description, certain terminology is used to describe certain features of one or more embodiments of the invention.

The term "tattoo" refers to any permanent or temporary image that is placed on skin.

The term "recording device" refers to any device that is a camera enabled playback device, such as, for example, a smartphone, a tablet, or augmented reality glasses, etc.

Various embodiments provide a system for augmented reality from tattoos. One embodiment of the present invention provides a system for augmented reality from tattoos. In another embodiment, there is provided a method for using the system. The system and method will now be disclosed in detail.

Referring now to FIG. 1, there is shown a diagram of a system 100 for personalizing augmented reality for individuals that is easy to use, according to one embodiment of the invention. The system comprises a central server 106 operably connected to a storage 108. The central server is communicatively coupled to one or more than one smart device 112 through the Internet 104 and 110. A user 102 uses a smart device 112 or a computing device (not shown) to access the central server 10 First, a person 102 selects or creates a personally meaningful multimedia object, for example a sound recording of a baby's first words. Then, a sound wave is generated from the selected multimedia object. Next, an image of the sound wave is generated of the resulting sound wave. The generated image of either the object or the image of the sound wave is then applied as a tattoo, either permanently or temporarily, to the person. An image of the applied tattoo, the generated image, and the multimedia object are uploaded, via the Internet, to a central server. The central server 106 automatically assigns a unique identification with all the uploaded data nd the uploaded data nd the unique identification are stored in a storage 108. Then a user with a smart device 112, such as, for example, a smartphone or a tablet, uses an application to view the tattoo on the person. The stored multimedia object 108 is then downloaded to the smart device 112, aligned and overlaid on the tattoo on the person, then the stored multimedia is played for the user from the central serve 106 via the Internet 110. As will be understood by those will skill in the art with reference to this disclosure, the multimedia object can be displayed on the person, next to the person, in front of or behind the person, depending on the sound wave and the multimedia object.

Figure 2:
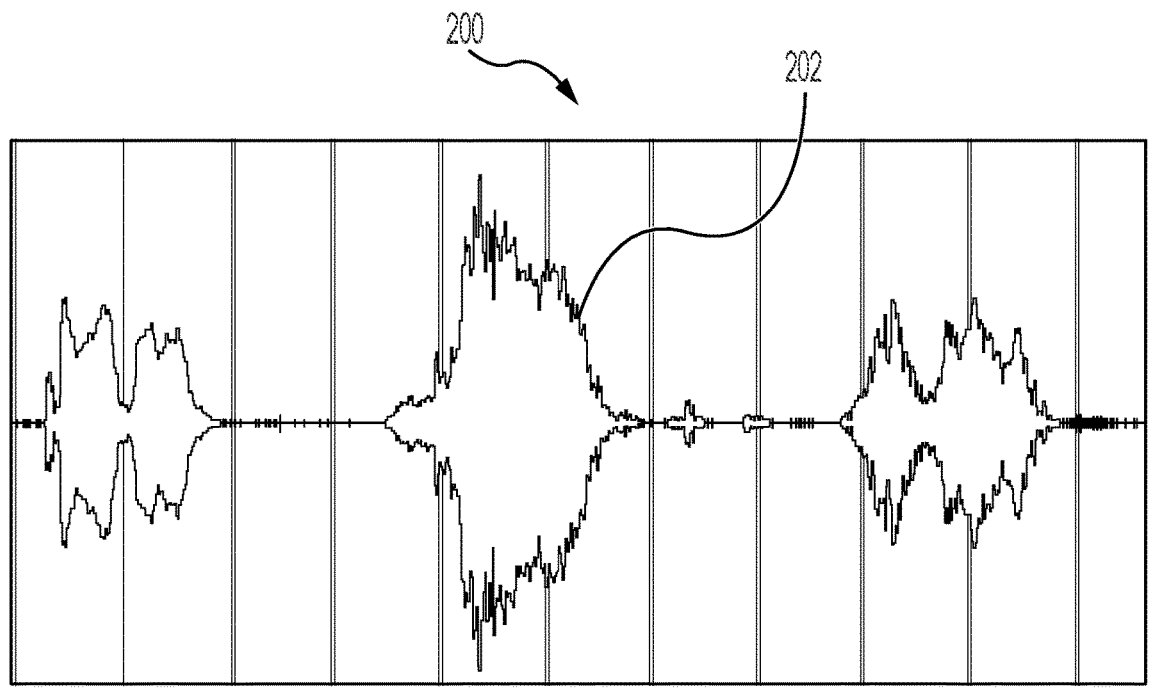
FIG. 2 is a diagram of a multimedia sound wave useful for the system of FIG. 1.

Referring now to FIG. 2, there is shown a diagram of a multimedia sound wave 200 useful for the system of FIG. 1. As can be seen, the multimedia sound wave 200 shows a recorded audio message waveform 202. The waveform 202 can be any multimedia, audio or video recording converted from an analog representation to a digital image. The waveform 202 is used to create a tattoo that will act as a unique identifier for playback and alignment of the stored augmented reality multimedia associated with the unique identifier. As will be understood by those will skill in the art with reference to this disclosure, each sound wave generated by a person is unique, making each sound wave a unique identifier. If the user selects a different type of multimedia to be stored and played back, the sound wave from that multimedia can also be used by itself or in conjunction with other indicia of the multimedia object to generate the unique identifier.

Figure 3:
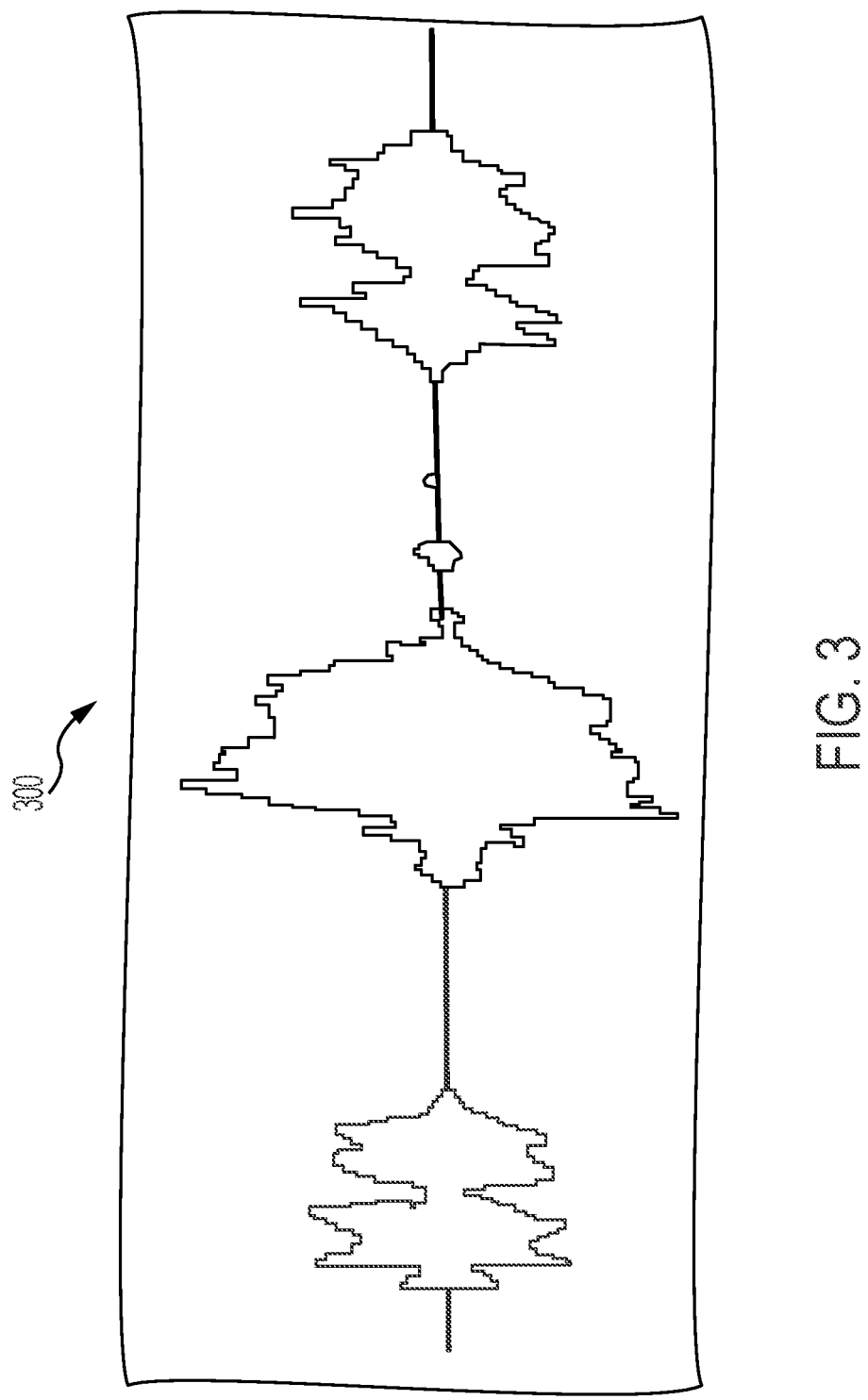
FIG. 3 is a tattoo of the multimedia sound wave of FIG. 2.

Referring now to FIG. 3, there is shown a tattoo 300 of the multimedia sound wave of FIG. 2. In this case, the analog representation of the waveform has been transferred to a person as a tattoo. As will be understood by those with skill in the art with reference to this disclosure, an exact duplication of the audio representation of the waveform is not possible in a tattoo. However, the system does not need an exact duplication of the audio waveform to operate correctly.

Figure 4:
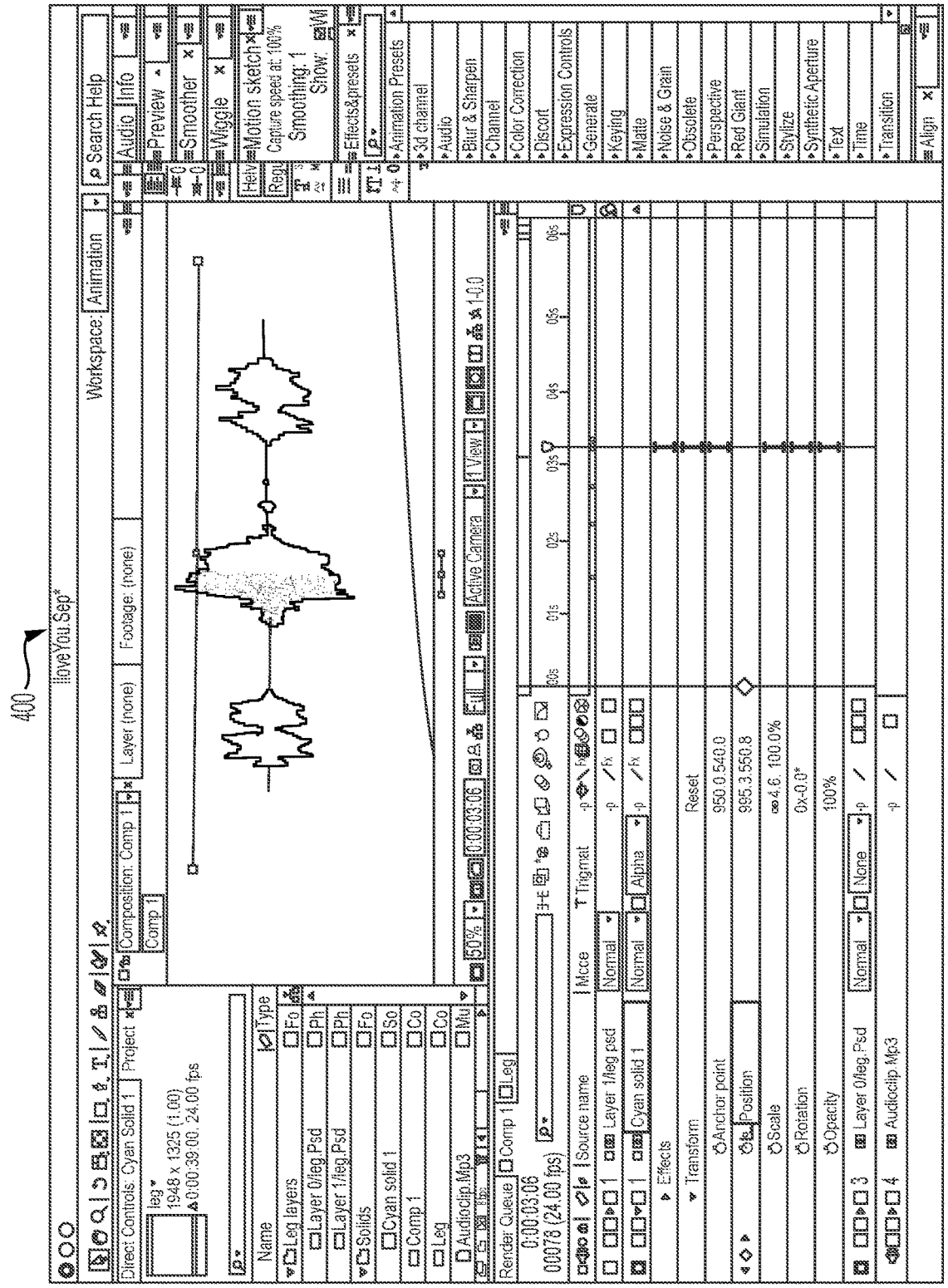
FIG. 4 is a diagram of a computer implemented method for creating an augmented reality overlay and unique identifier from a photo of the tattoo of FIG. 3.

Referring now to FIG. 4, there is shown a diagram of a computer implemented method for creating an augmented reality overlay and unique identifier from a photo of the tattoo of FIG. 3. Once the multimedia sound wave form, an image of the tattoo, and an associated multimedia file, collectively the associated data, are uploaded to the system 100, an overlay is created either manually, automatically, or both manually and automatically. Once the overlay has been created, the system 100 creates a unique identifier from the photograph of the finished tattoo, or, in the case of a pre-designed tattoo, the unique identifier is created based on the original design. The unique identifier and all the associated data re then stored in a storage 108 for later retrieval by a user. As will be understood by those with skill in the art with reference to this disclosure, the timing of the overlay can coincide with the playback of the sound waveform. Preferably, the overly is a video overlay that is matched and aligned to the tattoo. Alternatively, other overlays are possible and the example presented here is not meant to be limiting, but shows only one contemplated aspect of the system.

Figure 5:
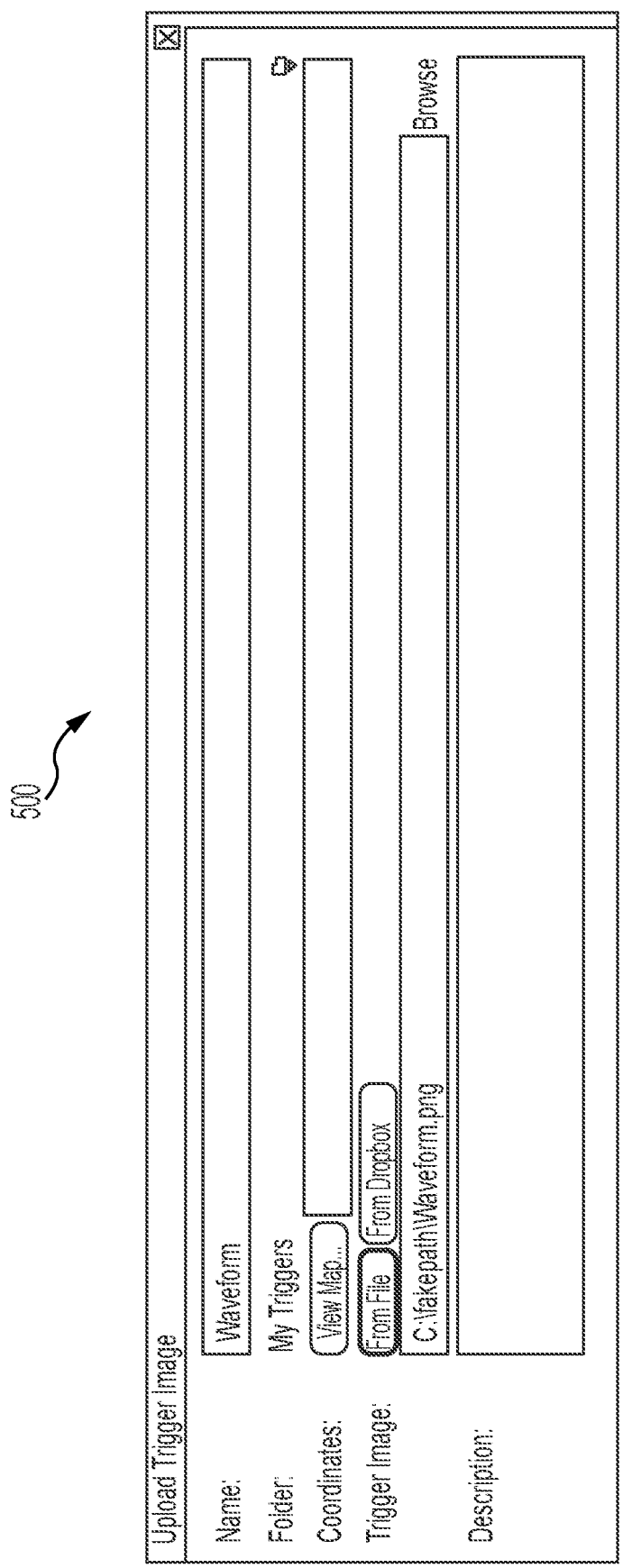
FIG. 5 is a screenshot diagram of uploading the completed tattoo created from user generated multimedia that becomes a unique identifier created from the completed tattoo.

Referring now to FIG. 5, there is shown a screenshot diagram 500 of uploading an image of the completed tattoo created from user generated multimedia. The image of the completed tattoo is converted into a unique identifier and both the image of the completed tattoo and the generated unique identifier are stored in the storage 108 on the central server 106 for later retrieval. As will be understood, the screenshot is only an example and not meant to be limiting. Other methods can be used to upload the required information to a central server 106 for later processing. For example, while at a theme park, a user can take a video of a theme park character's interaction with a child or a group and record that interaction on a recording device. The user can then upload the video of the interaction to the central server 106 that will process the video and produce an output such as a temporary tattoo that a child could wear. In another example, multiple copies of a pre-designed temporary tattoo can be distributed so that a group of people can experience a personal interaction with a character or other significant even. A specialized temporary tattoo printer can be utilized to customize each of the pre-designed temporary tattoos, or a permanent tattoo can be customized and made unique to the person. When another person, with the appropriate application, takes an image of the temporary tattoo, the entire interaction can be played back, or an edited version of the interaction can be played back, or just the sounds can be played back.

Additionally, commercialization of the system 100 is possible, by inserting special or specific multimedia, however, the memory is still personal. For example, a birthday party at a theme park or other attraction location can add a special message from a star of the theme park or attraction, such as a custom message from a cartoon character wishing a happy birthday to the guest of honor. A memory that can be made into a temporary or permanent tattoo and played back.

Many different personalizations of a memory are possible with the system 100, unlike the prior art. Unlike a photo book that can be lost or destroyed, a permanent memory can be tattooed on a person and whenever the person desires, the memory can be re-lived only using a recording device. The memory can be shared with others without the need to be in a specific place or sorting through hundreds of stored photos and videos.

Figure 6:
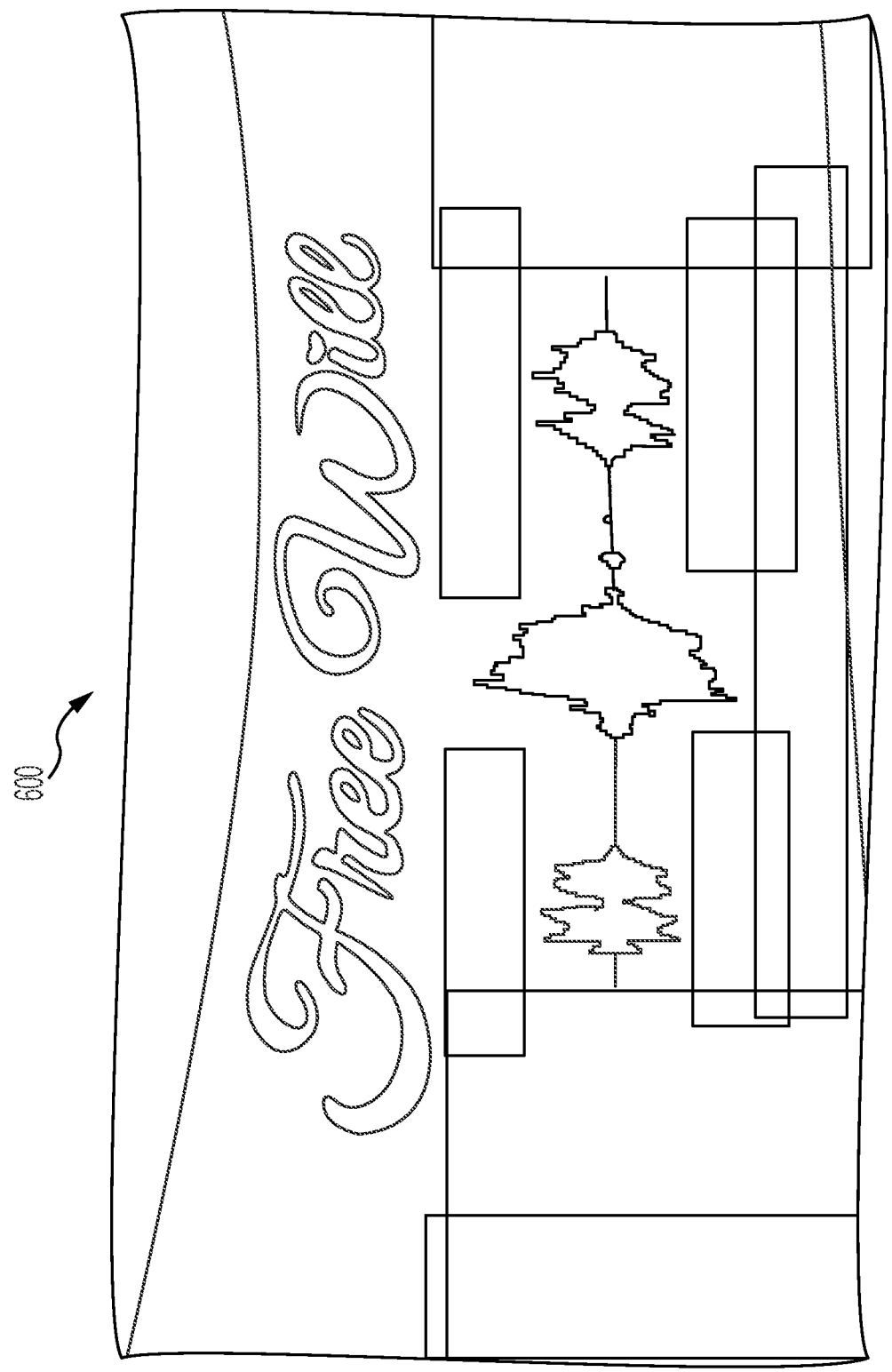
FIG. 6 is a screenshot diagram showing the system masking the tattoo to create a unique identifier target image and to prepare it for image recognition.

Referring now to FIG. 6, there is shown a screenshot diagram 600 showing the system 100 masking the tattoo to create a unique identifier from the uploaded image of the completed tattoo to prepare it for image recognition. The blue/gray portions are masked so as to not be analyzed by the system 100. This step can be avoided by cropping the image in the first place on the backend before the image of the completed tattoo is uploaded and stored 108 on the central server 106.

An application running on a smart device 112, such as for example, a smartphone or a tablet with a camera, captures an image or a live video of the tattoo. The image or live video is then sent to the central server and the associated overlay and multimedia content are retrieved and downloaded or streamed to the smart device 112 and the personalized multimedia ugmented reality is shown to the user.

Figure 7:
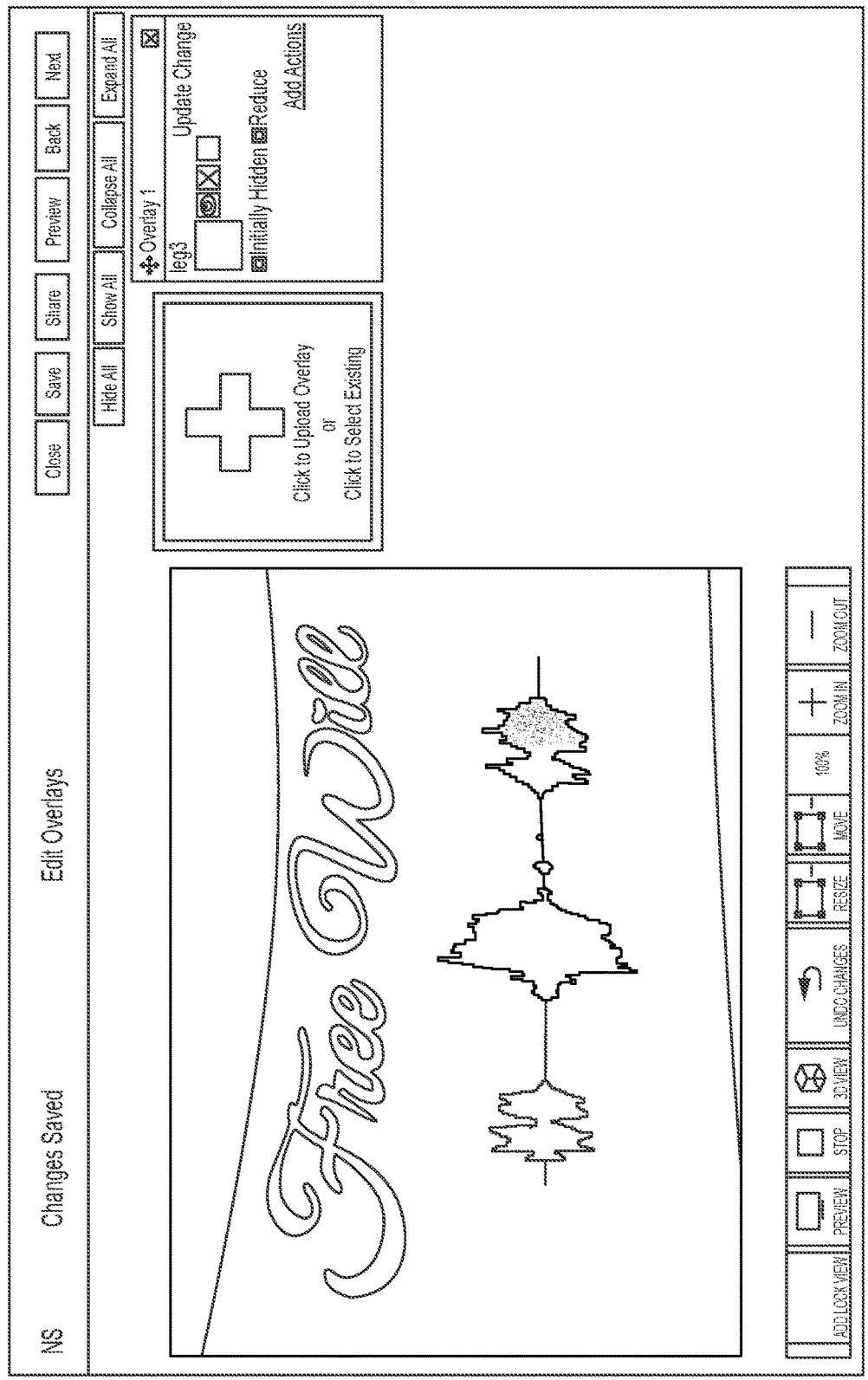
FIG. 7 is a diagram of an application that assigns a unique identifier to the image of the tattoo for playback and alignment of a stored multimedia.

Referring now to FIG. 7, there is shown a diagram 700 of an application that assigns a unique identifier to the image of the tattoo for playback and alignment of a stored multimedia. Here is shown how the unique identifier is created and assigned to the associated data stored in the storage of the central server. Additionally, the alignment to the stored image is created to be displayed over, and in relation to, the tattooed area stored in the image of the sound waveform. The overlay is moved along the sound waveform to show the progress of the sound waveform as it played.

Figure 8:
FIG. 8 is a screenshot of an application for playback and alignment of a stored multimedia file identified using the unique identifier.

Referring now to FIG. 8, there is shown a screenshot 800 of an application for playback and alignment of a stored multimedia file identified using the unique identifier. A user downloads the application from the central server 106 onto a smart device 112 and then takes an image or scans the tattooed area using the application. Then, the input image is analyzed within the application using instructions for image recognition to find the associated unique identifier. Next, the unique identifier is sent to the central server 106 where the corresponding associated data is stored 106. Next, the associated data corresponding to the unique identifier is sent back to the smart device 112 and the augmented reality is shown on the smartphone. In this case, the augmented reality is a moving color outline 802 of the sound wave. The moving color is displayed on the smart device as an overlay to the image. The associated data is retrieved from the storage 108, sent to the smart device 112 for playback coincident with the image and the moving color outline 802.

Figure 9:
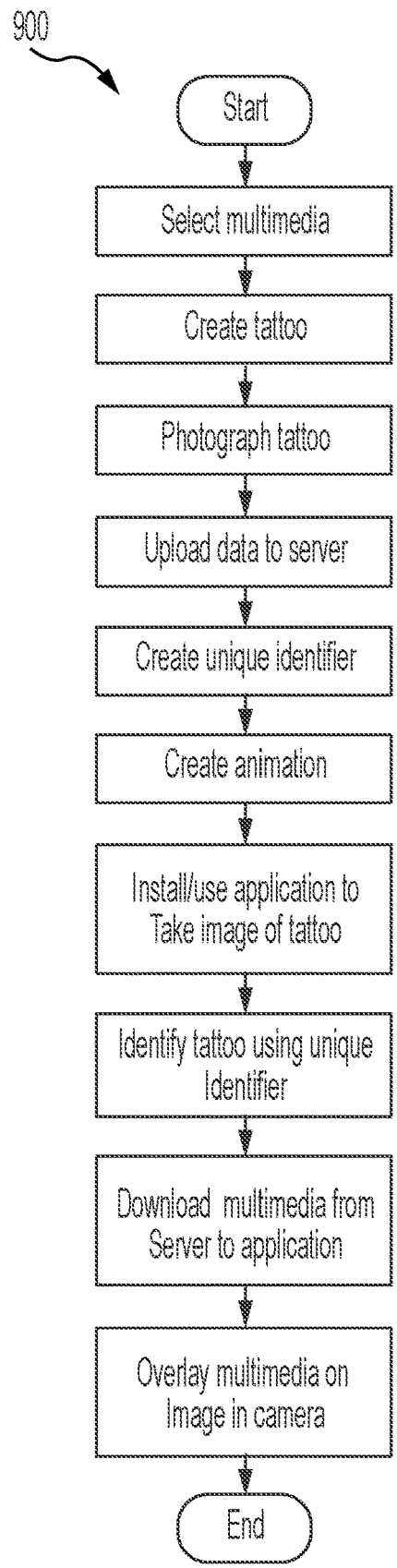
FIG. 9 is a flowchart diagram of some steps of a method for implementing the system of FIG. 1.

Referring now to FIG. 9, there is shown a flowchart diagram 900 of some steps of a method for implementing the system 100. The computer implemented method comprises instructions executable on a processor for personalizing augmented reality for individuals that is easy to use. First, a user selects 902 a multimedia file to be converted. Then, the multimedia file is converted 904 into a sound waveform tattoo. Next, a photograph 906 of a completed tattoo is taken. Then, the multimedia file, the converted sound waveform tattoo, and the photograph of the completed tattoo are uploaded 908 to the central server. Optionally, the pre-designed tattoo images and the associated data can also be uploaded to the central server 106 for commercial applications of the system 100. Next, a unique identifier is created 910 for all the uploaded data, collectively the associated data. Then, an animated augmented reality overlay is created 912 and stored with the associated data. The animated augmented reality overlay can be created manually, automatically, or both manually and automatically. Next, an augmented reality application is initialized or used 914 to take an image or scan of the tattoo on the user's skin using a camera enabled device. The image or scan is used by image recognition in the application to determine the unique identifier of the associated data nd to locate the associated data stored in the central server 106. Then, the image is identified by the system 100 using image recognition. Next, the associated data is downloaded to the camera enabled smart device 112. Finally, the augmented reality is overlaid and aligned 920 in relation to the live image captured or scanned by the camera enabled smart device 912 and the stored multimedia is displayed on the camera enabled device with all the options stored in the associated data.

Figure 10:
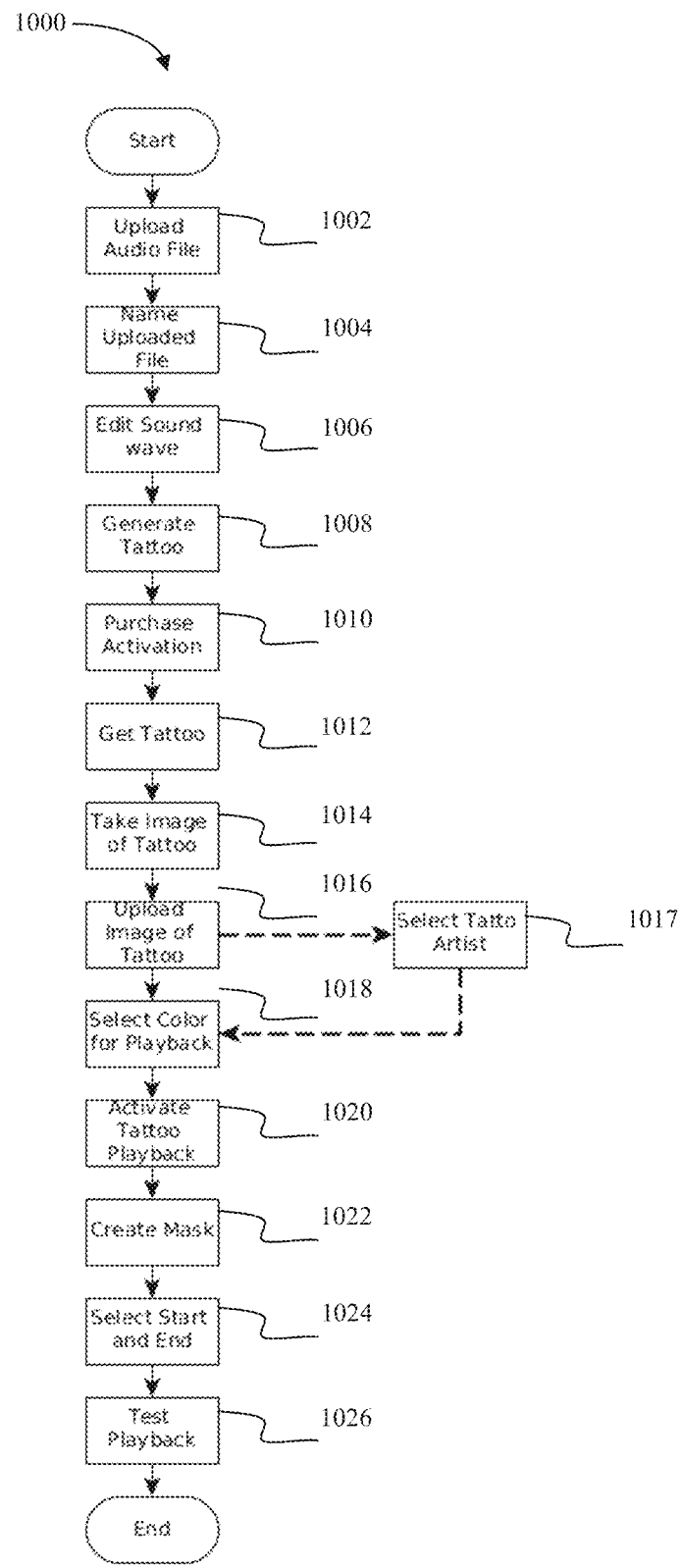
FIG. 10 is a flowchart diagram of some steps of another method for implementing the system of FIG. 1.

Referring now to FIG. 10, there is shown a flowchart diagram of some steps of another method for implementing the system of FIG. 1. First, a user uploads 1002 an audio or multimedia file to the central server 106. For any multimedia file other than strictly an audio file, the audio portion of the multimedia file is used for the remaining steps. Then, the user enters a name 1004 for the uploaded file. Next, the user can manually, automatically, or both manually and automatically edit the audio file 1006. Then, the central server executes instructions to generate a tattoo 1008 from the edited audio file. Next, the user purchases an activation 1010 to enable the playback of the uploaded audio or multimedia file. Then, the user goes to a tattoo artist and receives a tattoo 1012 similar to the generated tattoo. Next, the user takes an image of their tattoo 1014. Then, the user uploads 1016 that tattoo image 1014. Optionally, the user can select the tattoo artist 1017 to active a guarantee. Next, the user selects a color 1018 for the augmented reality overlay playback. Then, the user activates 1020 playback of their tattoo 1012. Next, a mask is created 1022 by the central server 106. Then, a start point and an end point for playback 1024 are determined either manually, automatically or both manually and automatically. Finally, the user tests the playback 1026 to insure that the system 100 if functioning.

Figure 11:
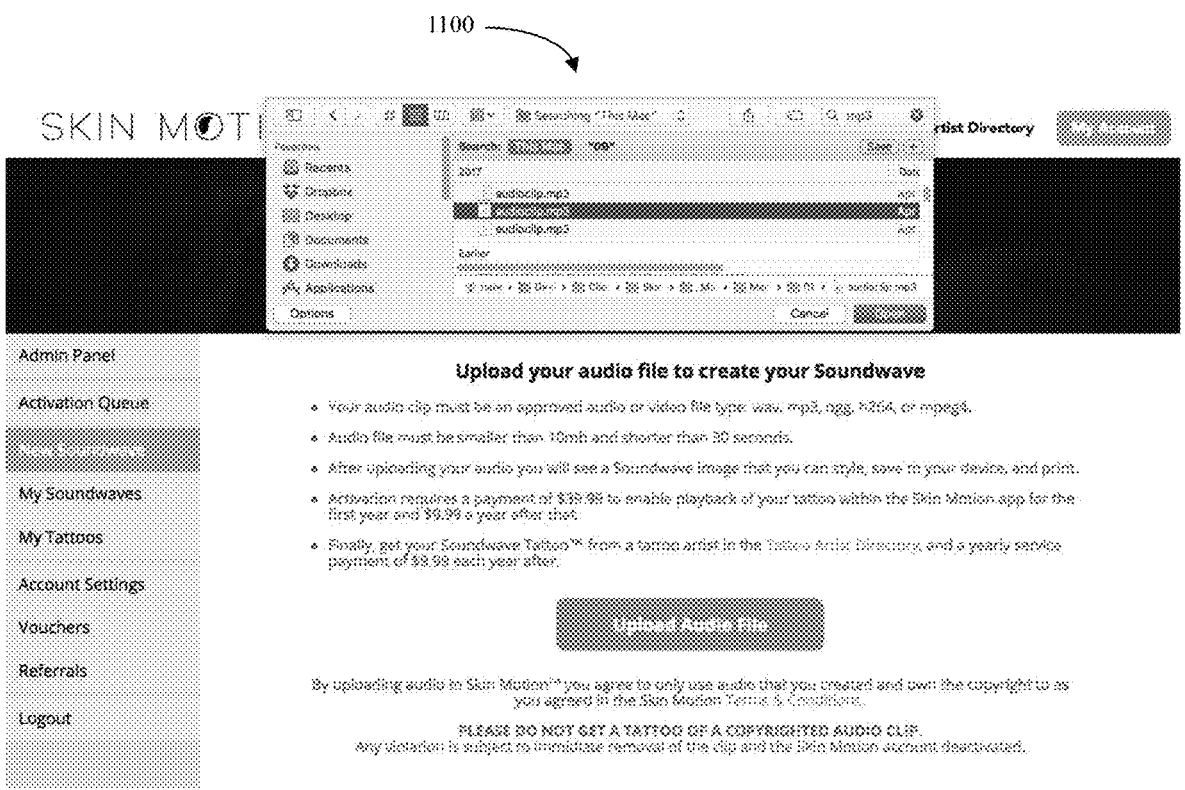
FIG. 11 is a screenshot of the first step in the method shown in the flowchart of FIG. 10.

Referring now to FIG. 11, there is shown a screenshot of the first step in the method shown in the flowchart of FIG. 10. The screenshot depicts the step of a user uploading 1002 an audio or multimedia file to the central server 106. As noted, for any multimedia file other than strictly an audio file, the audio portion of the multimedia file is used for the remaining steps. Also, the unique identifier is determined by the central server 106 using the uploaded audio file.

Figure 12:
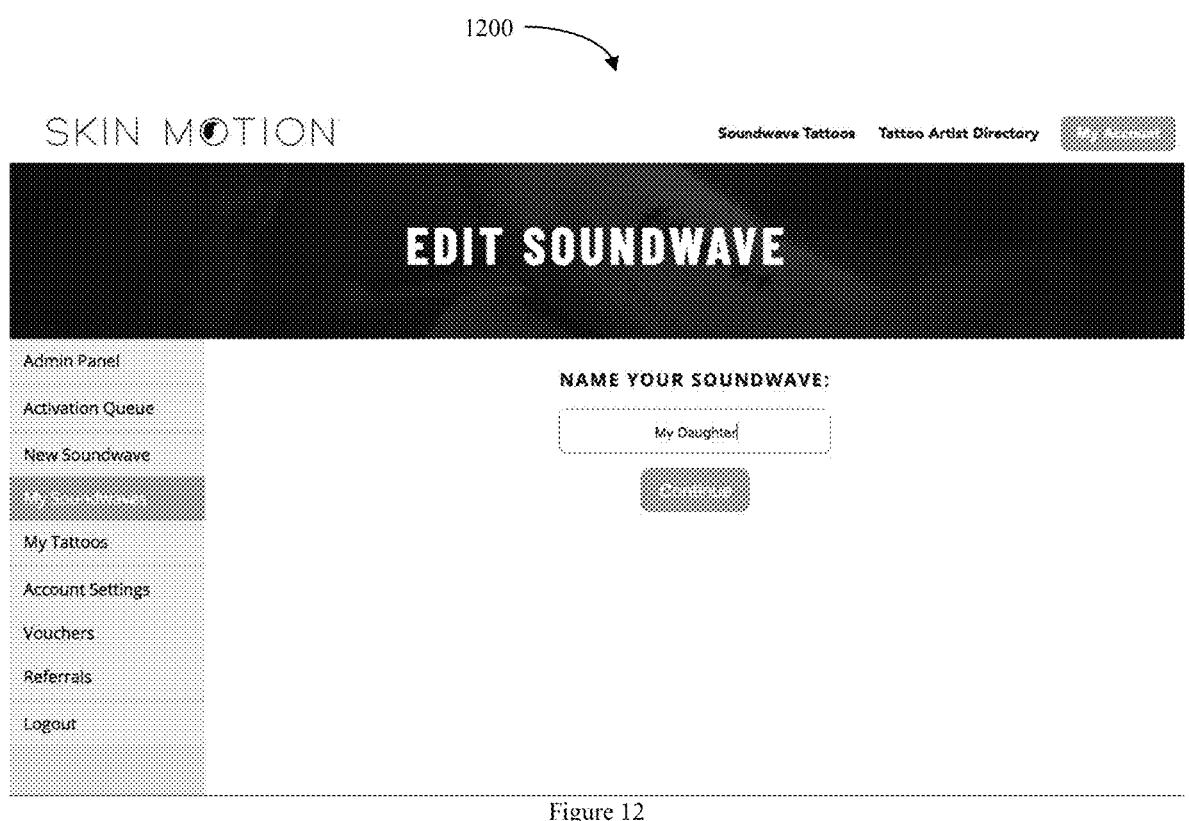
FIG. 12 is a screenshot of the second step in the method shown in the flowchart of FIG. 10.

Referring now to FIG. 12, there is shown a screenshot of the second step in the method shown in the flowchart of FIG. 10. The screenshot depicts the step of the user entering a name 1004 for the uploaded file.

Figure 13:
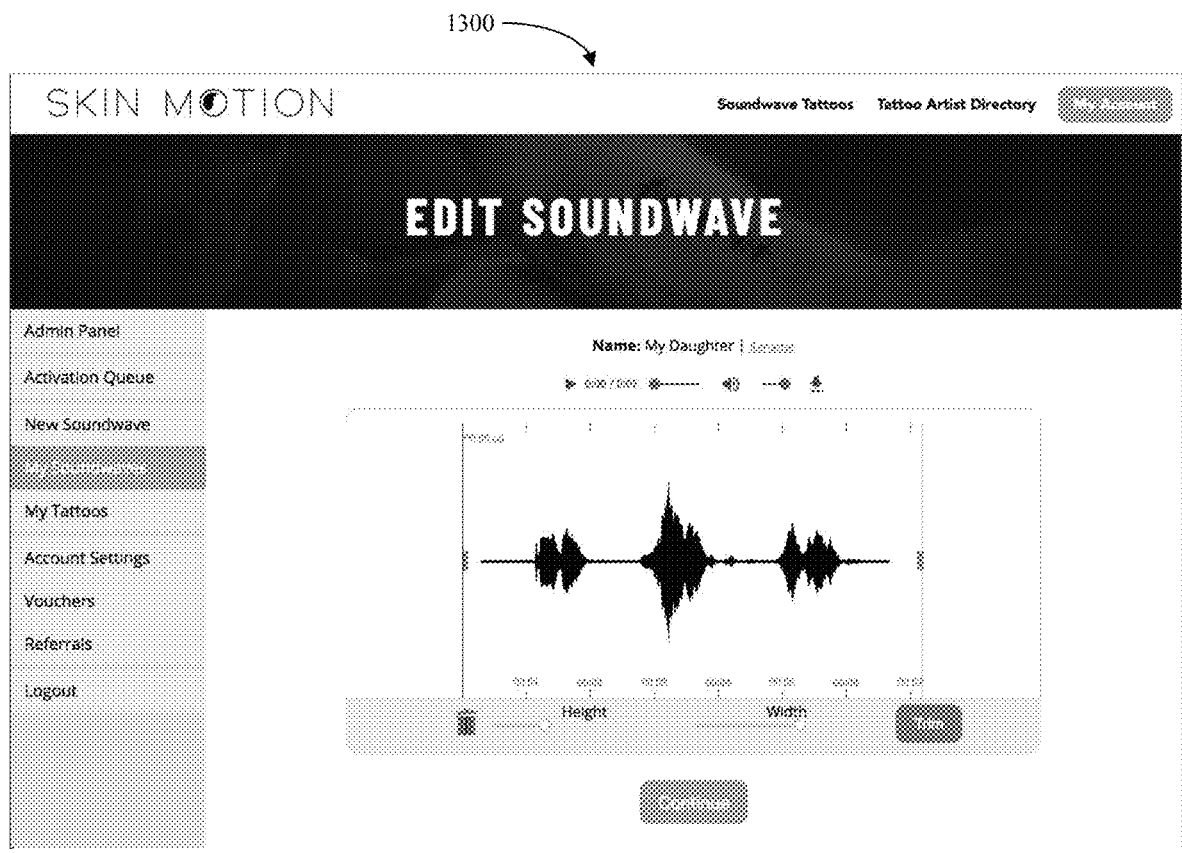
FIG. 13 is a screenshot of the third step in the method shown in the flowchart of FIG. 10.

Referring now to FIG. 13, there is shown a screenshot of the third step in the method shown in the flowchart of FIG. 10. The screenshot depicts the step of the user manually, automatically, or both manually and automatically editing the audio file 1006.

Figure 14:
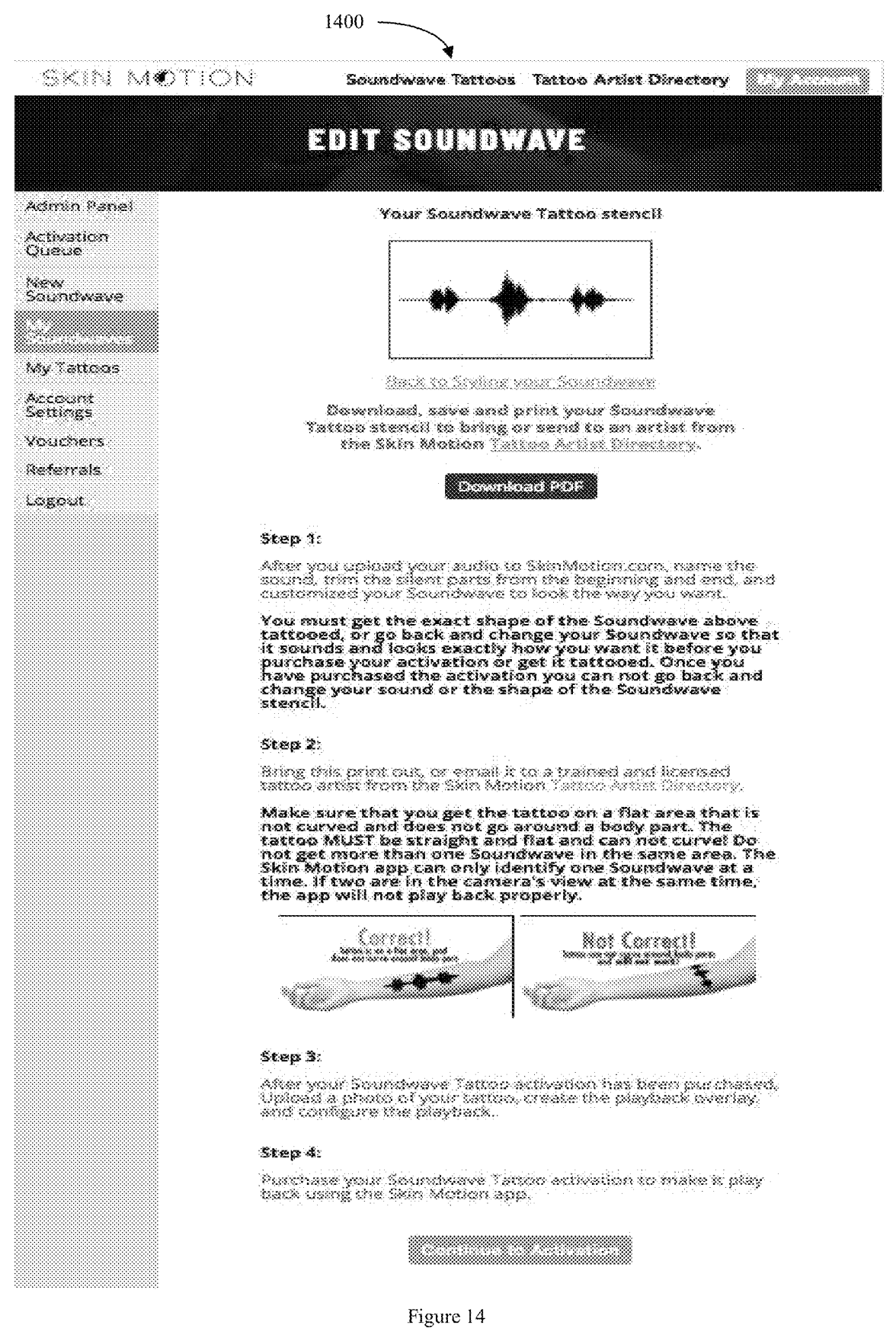

Referring now to FIG. 14, there is shown a screenshot of the fourth step in the method shown in the flowchart of FIG. 10. The screenshot depicts the step of the central server 106 executing instructions to generate a tattoo 1008 from the edited audio file.

Figure 15:
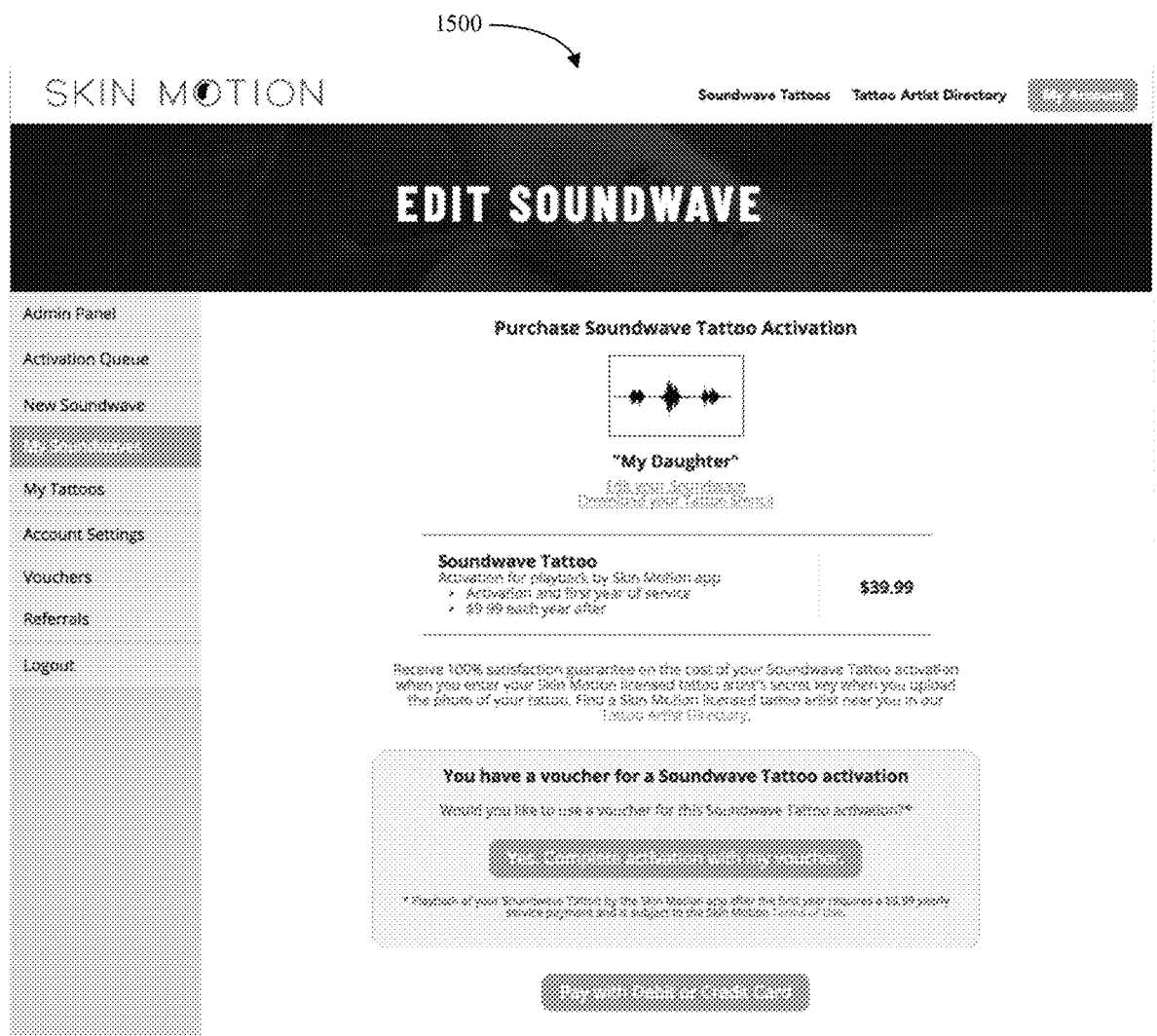
FIG. 15 is a screenshot of the fifth step in the method shown in the flowchart of FIG. 10.

Referring now to FIG. 15, there is shown a screenshot of the fifth step in the method shown in the flowchart of FIG. 10. The screenshot depicts the step of the user purchasing an activation 1010 to enable the playback of the uploaded audio or multimedia file.

Figure 16:
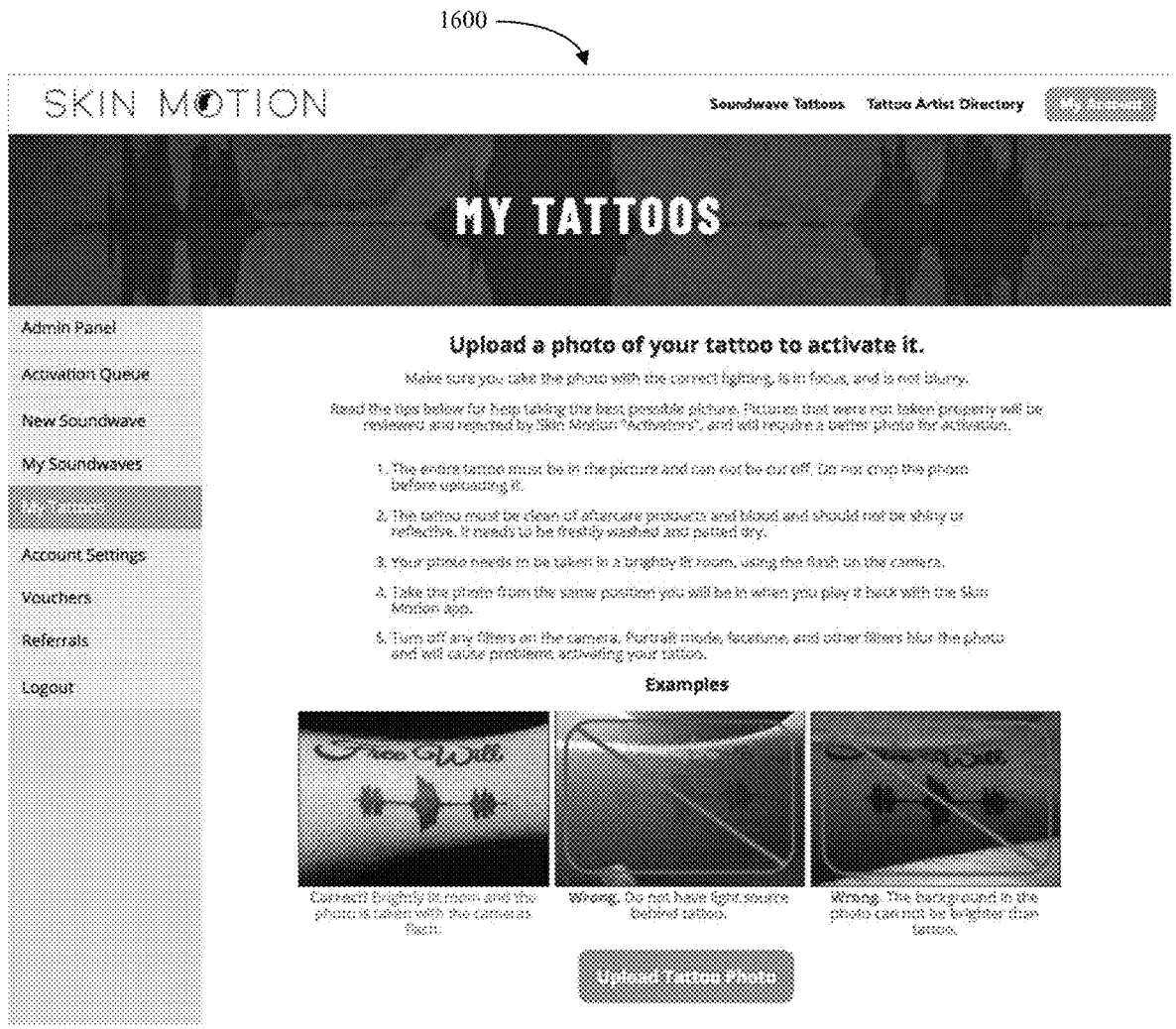
FIG. 16 is a screenshot of the sixth step in the method shown in the flowchart of FIG. 10.

Referring now to FIG. 16, there is shown a screenshot of the sixth step in the method shown in the flowchart of FIG. 10. The screenshot depicts the step of the user getting a a tattoo 1012 similar to the generated tattoo.

Figure 17:
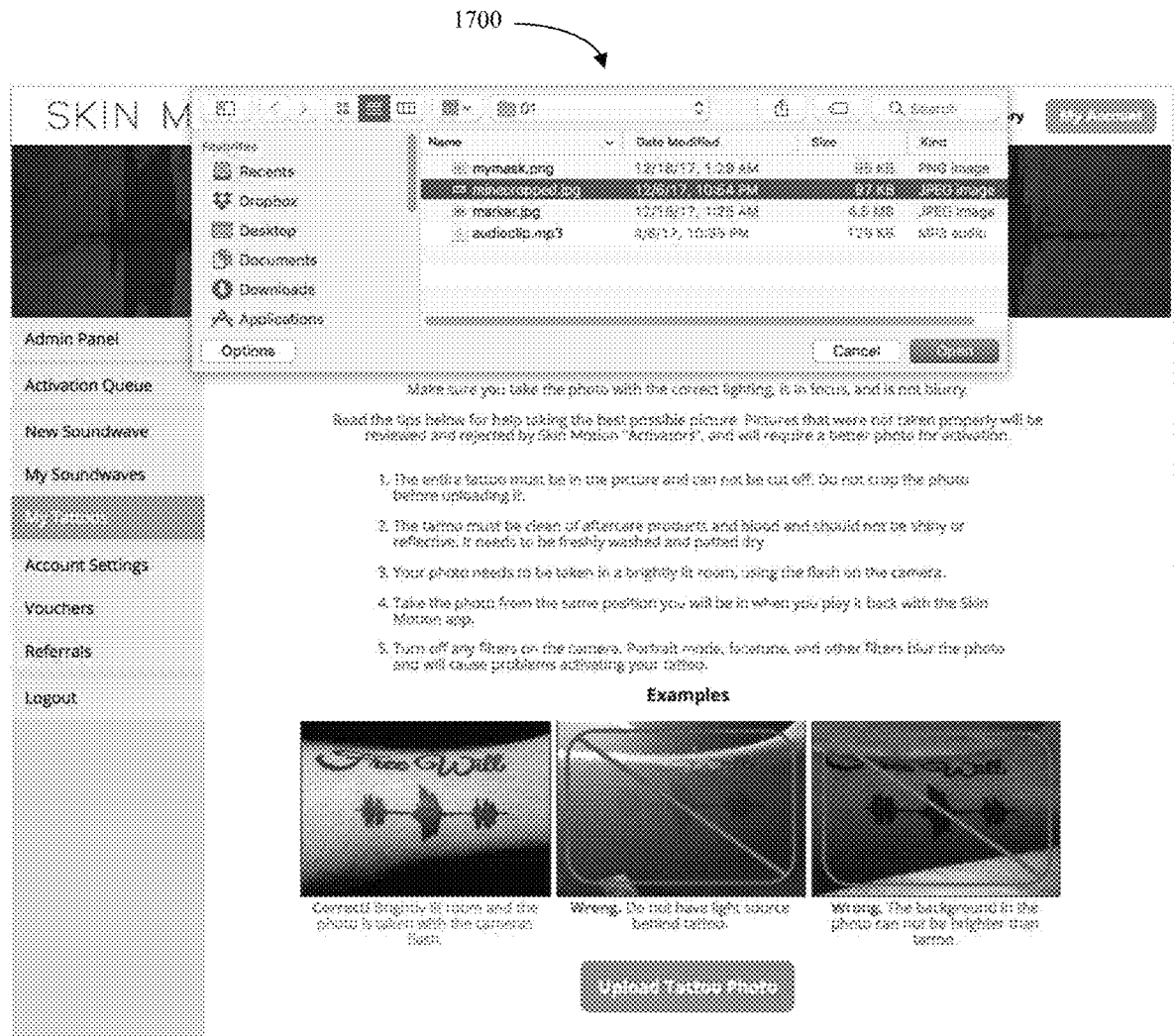
FIG. 17 is a screenshot of the seventh step in the method shown in the flowchart of FIG. 10.

Referring now to FIG. 17, there is shown a screenshot of the seventh step in the method shown in the flowchart of FIG. 10. The screenshot depicts the step of the user taking and uploading an image of their tattoo 1014. Then, the user uploads 1016 that tattoo image 1014.

Figure 18:
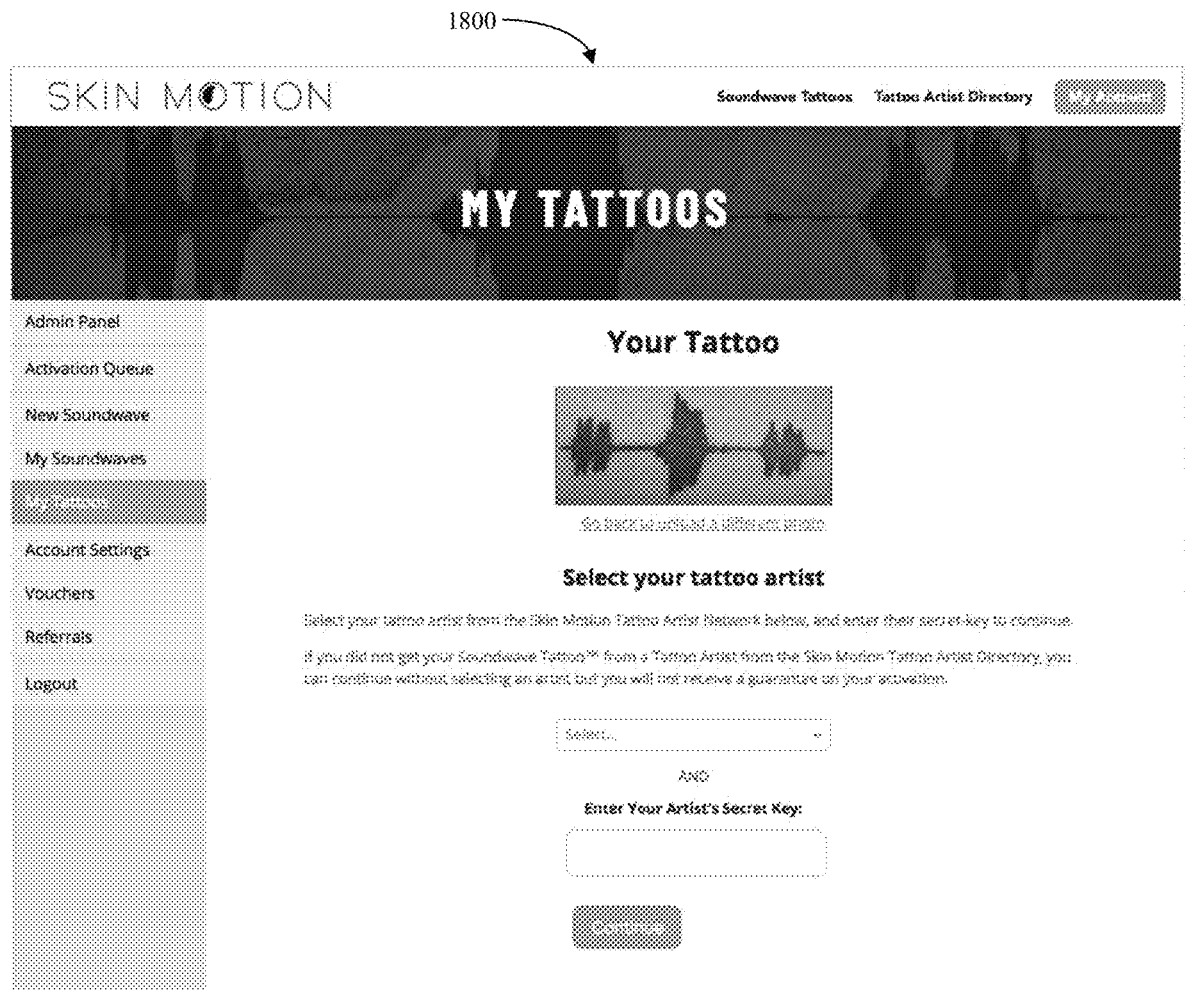
FIG. 18 is a screenshot of the eighth step in the method shown in the flowchart of FIG. 10.

Referring now to FIG. 18, there is shown a screenshot of the eighth step in the method shown in the flowchart of FIG. 10. The screenshot depicts the optional step of selecting the tattoo artist 1017 to active a guarantee.

Figure 19:
FIG. 19 is a screenshot of the ninth step in the method shown in the flowchart of FIG. 10.

Referring now to FIG. 19, there is shown a screenshot of the ninth step in the method shown in the flowchart of FIG. 10. The screenshot depicts the step of the user selecting a color 1018 for the augmented reality overlay playback.

Figure 20:
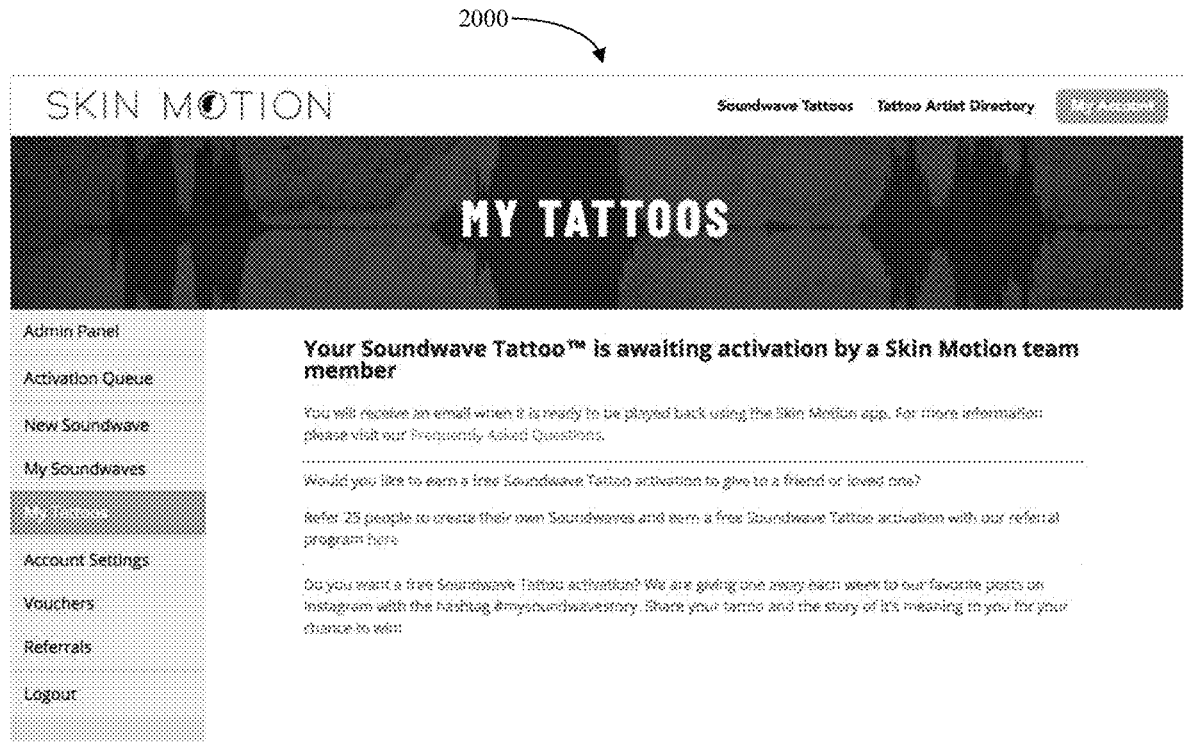
FIG. 20 is a screenshot of the tenth step in the method shown in the flowchart of FIG. 10.

Referring now to FIG. 20, there is shown a screenshot of the tenth step in the method shown in the flowchart of FIG. 10. The screenshot depicts the step of the user activating 1020 playback of their tattoo 1012.

Figure 21:
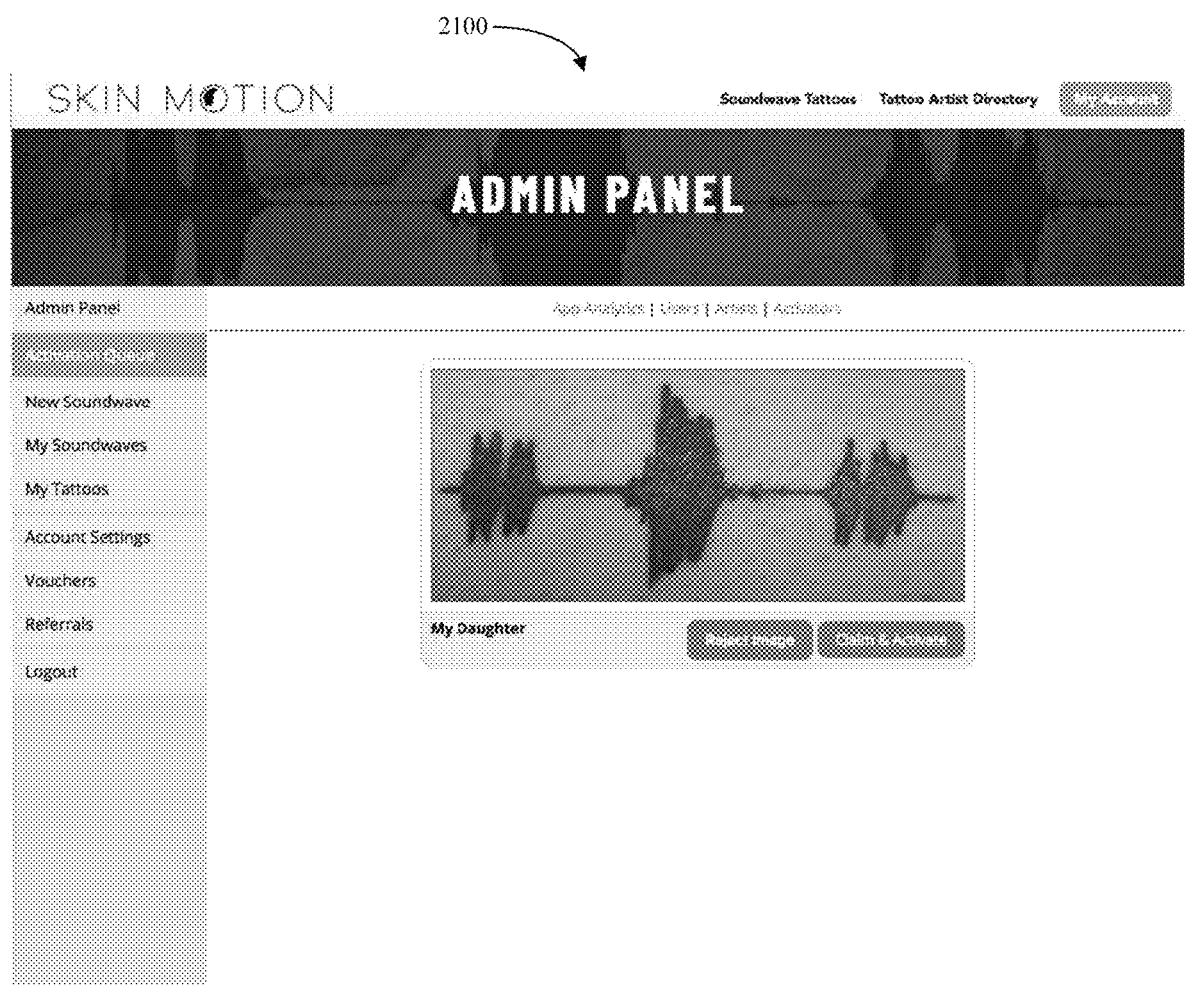
FIG. 21 is a screenshot of the eleventh step in the method shown in the flowchart of FIG. 10.

Referring now to FIG. 21, there is shown a screenshot of the eleventh step in the method shown in the flowchart of FIG. 10. The screenshot depicts the step of the user deciding whether the uploaded image will be used to activate the system 100.

Figure 22:
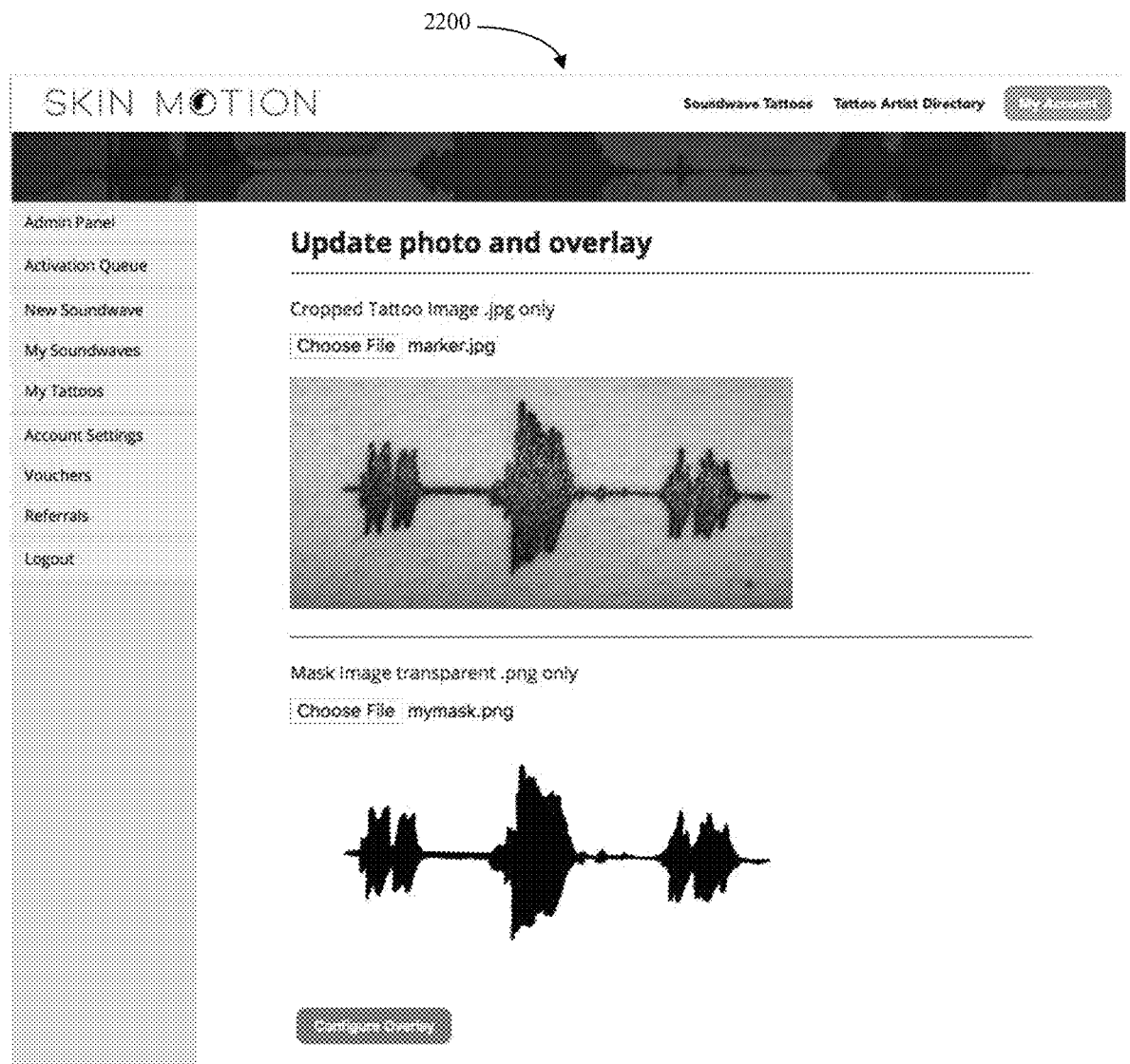
FIG. 22 is a screenshot of the twelfth step in the method shown in the flowchart of FIG. 10.

Referring now to FIG. 22, there is shown a screenshot of the twelfth step in the method shown in the flowchart of FIG. 10. The screenshot depicts the step of a mask being created 1022 by the central server 106.

Figure 23:
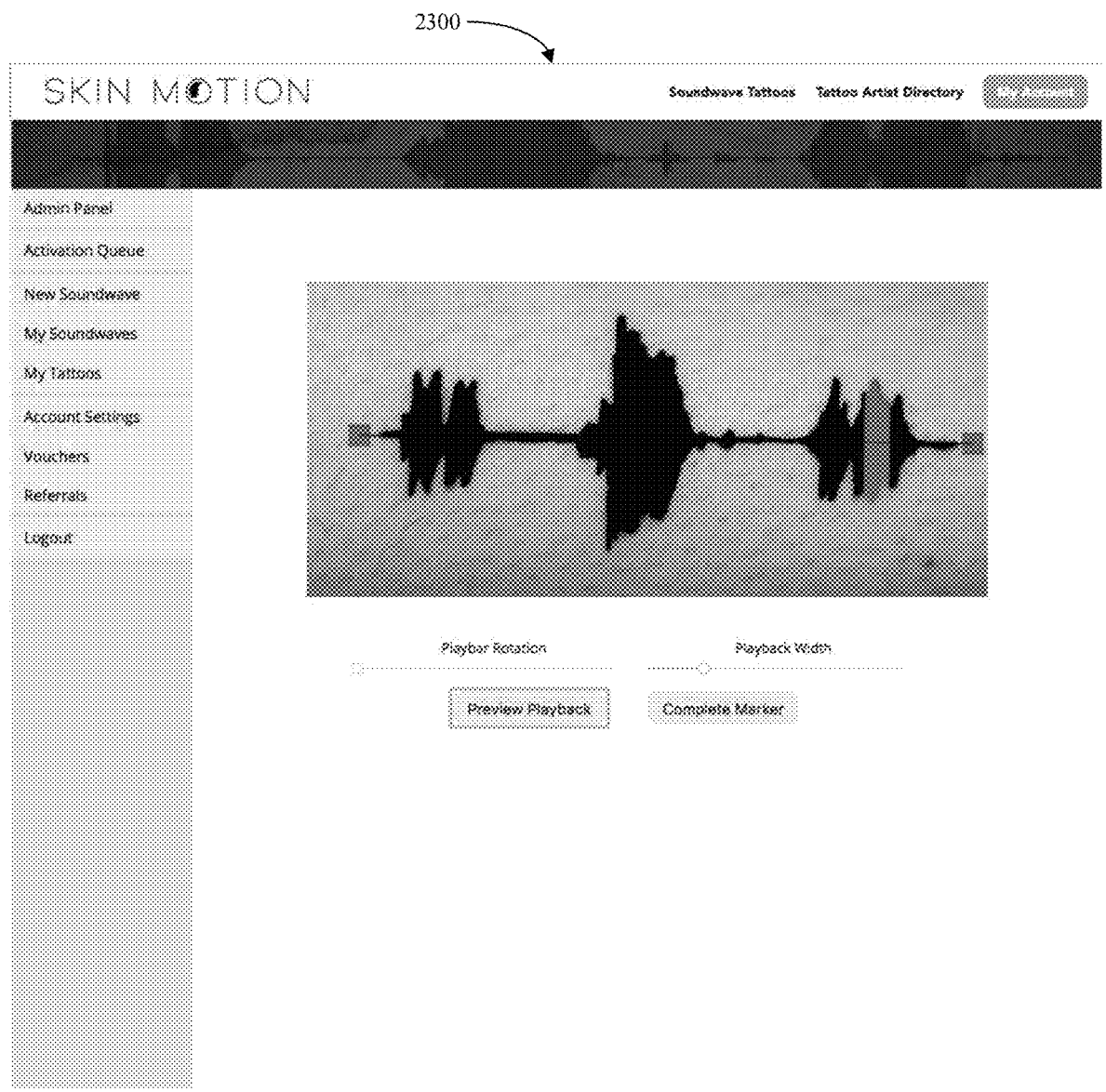
FIG. 23 is a screenshot of the thirteenth step in the method shown in the flowchart of FIG. 10.

Referring now to FIG. 23, there is shown a screenshot of the thirteenth step in the method shown in the flowchart of FIG. 10. The screenshot depicts the step of determining either manually, automatically or both manually and automatically a start point and an end point for playback 1024.

Figure 24:
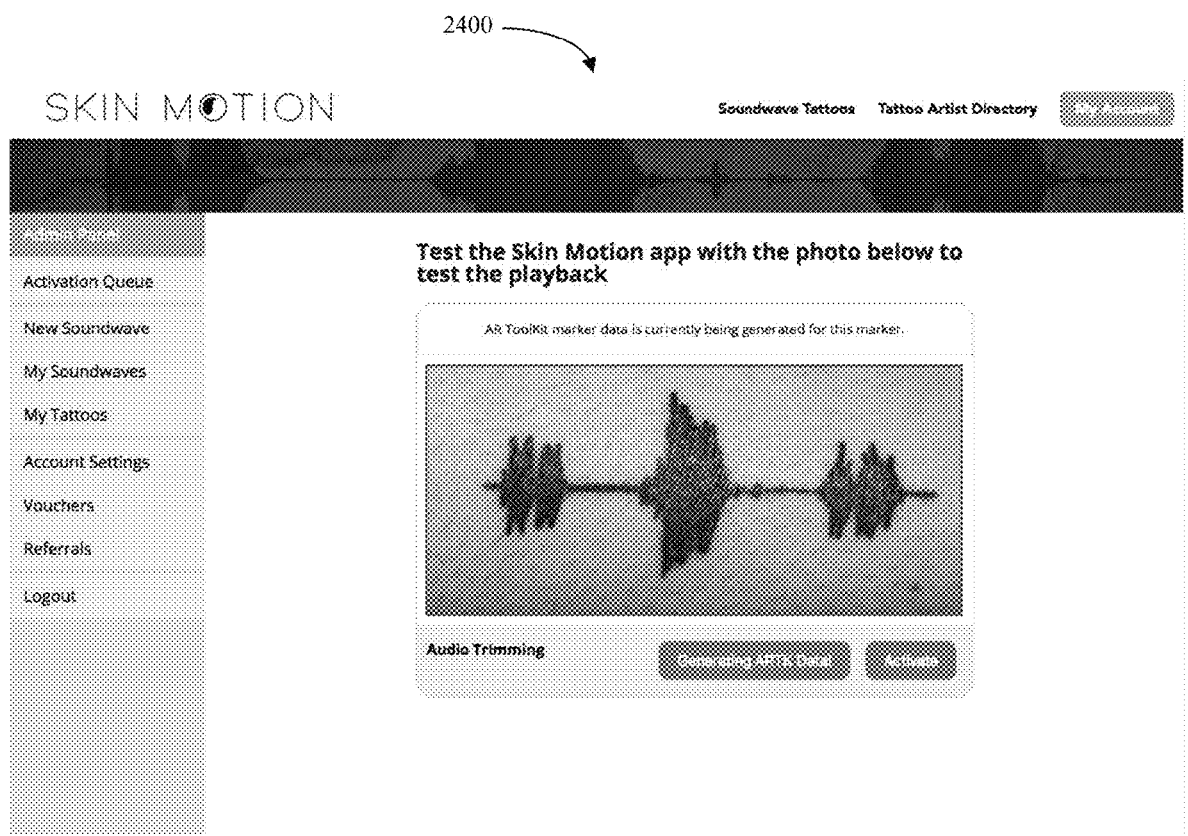
FIG. 24 is a screenshot of the thirteenth step in the method shown in the flowchart of FIG. 10.
Figure 25:
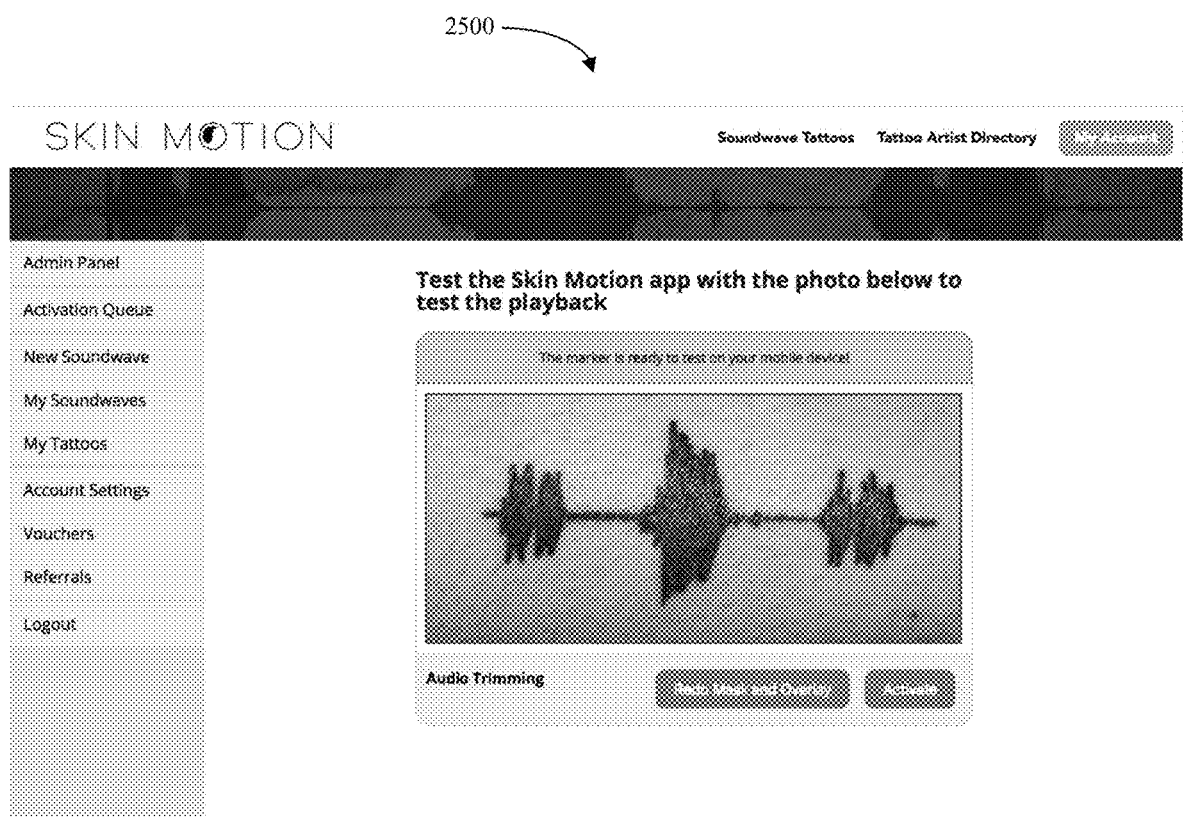
FIG. 25 is a screenshot of the final step in the method shown in the flowchart of FIG. 10.

Referring now to FIGS. 24 and 25, there are shown a screenshot of the final step in the method shown in the flowchart of FIG. 10. The screenshot depicts the step of the user testing the playback 1026 to insure that the system 100 if functioning.

What has been described is a new and improved system 100 for personalizing augmented reality for individuals that is easy to use, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A computer implemented method for personalizing augmented reality for individuals that is easy to use, the method comprising the steps of:
   creating an augmented reality overlay from a photo of a tattoo, wherein the augmented reality overlay is created by at least one of manually creating the augmented reality overlay from the photo of the tattoo and automatically creating the augmented reality overlay from the photo of the tattoo;
   uploading the photo of the tattoo and a multimedia file with an associated inherent multimedia sound wave form to a central server;
   automatically creating a unique identifier from the photo of the tattoo, wherein, when the tattoo is a pre-designed tattoo, the unique identifier is created based on an original design of the tattoo;
   storing the unique identifier and associated data in a storage for later retrieval by a user; and
   playing the associated data retrieved from the storage using the unique identifier as a timed overlay coincident with the playback of the associated data, wherein, when the timed overly is a video overlay, the timed video overlay is matched and aligned to the tattoo.

2. A system for personalizing augmented reality for individuals that is easy to use, the system comprising:
a smart device comprising software, a camera, a processor, and an interface that is configured to enable a user to interact with the software and the camera when the software is running on the processor of the smart device, wherein the software comprises executable instructions for (i) receiving a selection of a multimedia object, (ii) generating a sound wave from the selected multimedia object, (iii) generating a waveform image of the sound wave, (iv) capturing, by way of the camera, an applied waveform tattoo image of a waveform tattoo applied, based on the waveform image, to a person, (v) uploading, to a central server, data comprising the applied waveform tattoo image, the waveform image, and the multimedia object; (vi) determining, based on a subsequent image of the waveform tattoo applied to the person that is captured by way of the camera after the uploaded data is received by the central server, an identifier to use in requesting the multimedia object from the central server, (vii) retrieving the multimedia object by using the determined identifier to request the multimedia object from the central server, (viii) receiving the multimedia object from the central server, (ix) aligning and overlaying the multimedia object on the subsequent image of the waveform tattoo, and (x) playing the multimedia object on the smart device as an overlay aligned with the waveform tattoo applied to the person; and
the central server comprising a server processor, a storage, and a program which, when running on the server processor, performs executable instructions comprising (i) receiving, from the smart device, the uploaded data comprising the applied waveform tattoo image, the waveform image, and the multimedia object, (ii) automatically generating a unique identifier based on the applied waveform tattoo image, the waveform image, and the multimedia object, (iii) assigning the unique identifier to the uploaded data, (iv) storing the uploaded data and the unique identifier in the storage, (v) receiving, from any particular smart device configured to capture a photo of the waveform tattoo applied to the person and determine the unique identifier assigned to the uploaded data based on the photo of the waveform tattoo, the unique identifier assigned to the uploaded data, (vi) using the received unique identifier to retrieve the multimedia object from the storage, and (vii) transmitting the retrieved multimedia object to the particular smart device to align with and overlay the photo of the waveform tattoo applied to the person as viewed on the particular smart device, wherein playback of the multimedia object is enabled on the particular smart device when the multimedia object is aligned with and overlays the photo of the waveform tattoo applied to the person.

3. The system of claim 2, wherein the multimedia object comprises one of a multimedia recording, an audio recording, and video recording, wherein the sound wave is generated as an analog representation of sound for the multimedia object, wherein the waveform image comprises a digital image conversion of the analog representation of sound for the multimedia object.

4. The system of claim 2, wherein the waveform image acts as the unique identifier for playback and alignment, by the smart device, of the multimedia object as an augmented reality overlay of the waveform tattoo applied to the person.

5. The system of claim 2, wherein the selected multimedia object comprises a first multimedia object of a first type of multimedia, wherein a second multimedia object of a second type of multimedia that is different from the first type of multimedia is able to be selected for generation of a second waveform image based on a second sound wave associated with the second multimedia object, wherein a second unique identifier to assign to the second multimedia object can be generated from one of the second waveform image by itself and a combination of the second waveform image and other indicia of the second multimedia object.

6. A method for personalizing augmented reality for individuals that is easy to use, the method comprising the steps of:
selecting, by a user of a user computing device, a multimedia file to be converted and used in connection with an augmented reality overlay;
converting the multimedia file, by the user computing device, into a two dimensional sound waveform image to apply to a skin surface of a person as a tattoo;
capturing a digital photograph of the tattoo applied to the skin surface of the person;
uploading data to a central server, by the user computing device, said uploaded data comprising the multimedia file, the two dimensional sound waveform image, and the digital photograph of the tattoo applied to the skin surface of the person;
creating, by the central server, a unique identifier from the uploaded data;
collectively associating, by the central server, the uploaded data with the unique identifier;
creating an animated augmented reality overlay;
storing, by the central server, the animated augmented reality overlay with the collectively associated uploaded data in a storage of the central server;
initializing an augmented reality application on a smart device, wherein the augmented reality application comprises an image recognition application;
using the augmented reality application and a camera of the smart device to capture an image of the tattoo applied to the skin surface of the person, wherein the image recognition application is configured to recognize the captured image and, based on recognition of the captured image, determine the unique identifier of the collectively associated uploaded data to retrieve from the central server;
automatically identifying, by the image recognition application of the augmented reality application, the captured image and the unique identifier of the collectively associated uploaded data;
transmitting, by the central server, the collectively associated uploaded data to the smart device; and
overlaying, aligning, and displaying the animated augmented reality overlay in relation to a live image of the tattoo applied to the skin surface of the person as captured by the smart device.

7. The method of claim 6, wherein the two dimensional sound waveform image is applied as a tattoo to a flat area of the skin surface of the person.

8. The method of claim 6, wherein the animated augmented reality overlay is created by at least one of (i) automatically by the central server and (ii) manually by the user of the user computing device.

* * * * *